(12) United States Patent
Family et al.

(10) Patent No.: US 10,061,009 B1
(45) Date of Patent: Aug. 28, 2018

(54) ROBUST CONFIDENCE MEASURE FOR BEAMFORMED ACOUSTIC BEACON FOR DEVICE TRACKING AND LOCALIZATION

(71) Applicant: Apple Inc., Cupertino, CA (US)

(72) Inventors: Afrooz Family, Emerald Hills, CA (US); Martin E. Johnson, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 534 days.

(21) Appl. No.: 14/867,998

(22) Filed: Sep. 28, 2015

Related U.S. Application Data

(60) Provisional application No. 62/057,998, filed on Sep. 30, 2014.

(51) Int. Cl.
*G01S 3/80* (2006.01)
(52) U.S. Cl.
CPC ....................... *G01S 3/80* (2013.01)
(58) Field of Classification Search
CPC .......................................... G01S 3/80
See application file for complete search history.

(56) References Cited

U.S. PATENT DOCUMENTS

| | | | |
|---|---|---|---|
| 5,555,532 A * | 9/1996 | Sacha | G01S 7/539 367/100 |
| 9,749,747 B1 * | 8/2017 | Kriegel | H04R 5/02 |
| 2012/0093344 A1 | 4/2012 | Sun et al. | |
| 2013/0223658 A1* | 8/2013 | Betlehem | H04R 5/02 381/307 |
| 2013/0272548 A1 | 10/2013 | Visser et al. | |
| 2014/0074435 A1 | 3/2014 | Cohn et al. | |

* cited by examiner

*Primary Examiner* — Daniel Pihulic
(74) *Attorney, Agent, or Firm* — Womble Bond Dickinson (US) LLP

(57) ABSTRACT

A system and method is described for generating a confidence level for data generated by a beamforming acoustic beacon system. The system may include an audio emission device to emit a set of sounds corresponding to a set of predefined modal patterns into a listening area. The sounds may be detected by an audio capture device to produce a set of impulse responses corresponding to the modal patterns. The impulse responses may be processed to produce a set of window synthesized impulse responses for various angles. These window synthesized impulse responses may (1) be formed based on a weighted set of the modal patterns that were originally used to emanate sound and (2) seek to emulate a target beam, which is also composed of the same weighted modal patterns. A confidence level may be computed based on the difference between the window synthesized impulse responses and the target beam pattern.

20 Claims, 12 Drawing Sheets

ROBUST CONFIDENCE MEASURE FOR BEAMFORMED ACOUSTIC BEACON FOR DEVICE TRACKING AND LOCALIZATION

This non-provisional application claims the benefit of the earlier filing date of provisional application No. 62/057,998 filed Sep. 30, 2014.

A system and method is described for generating a confidence level for data generated by a beamforming acoustic beacon. Other embodiments are also described.

BACKGROUND

It is often useful to know the location/orientation of a sound source (e.g., a user or a loudspeaker) relative to the boundaries of a room (e.g., walls) or relative to a device (e.g., a computer or loudspeaker). For example, this location/orientation information may be utilized for optimizing audio-visual rendering by a computing device. Traditionally, location information has been determined using various techniques; however, these techniques often suffer from accuracy issues. In particular, the accuracy issues may be related to noises in the listening area, obstacles in the listening area, or other external factors. In some instances, these accuracy issues are severe and result in location/orientation information being generated that is considerably different from the actual location/orientation of the sound source. Accordingly, in these situations, changes/optimizations based on this severely inaccurate information may produce similarly poor results.

In other instances, the location/orientation information may be accurate or within a prescribed tolerance. However, traditional systems and methods do not offer a technique for determining the accuracy or confidence level associated with location/orientation measurements.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

A system and method is described for generating a confidence level for data generated by a beamforming acoustic beacon. In one embodiment, an audio emission device may emit a set of sounds corresponding to a set of predefined modal patterns into a listening area. The sounds may be detected by an audio capture device to produce a set of impulse responses corresponding to the modal patterns. The impulse responses may be processed to produce a set of window synthesized impulse responses for various angles. These window synthesized impulse responses may (1) be formed based on a weighted set of modal patterns that were originally used to emanate sound into the listening area and (2) seek to emulate a target beam, which is also composed of the same weighted modal patterns.

In one embodiment, the largest window synthesized impulse responses may correspond to an angle/direction describing the location/orientation of the audio emission device in relation to the audio capture device (i.e., the highest level of direct sound). The accuracy of this angle may be determined through the calculation of a confidence level. In one embodiment, this confidence level is computed by comparing the difference between the window synthesized impulse responses and the target beam pattern that the window synthesized impulse responses are intended to emulate at various angles. In this embodiment, small differences between the window synthesized impulse responses and the target beam may result in the generation of a high confidence level. This high confidence level indicates a high probability that the orientation/angle estimates are accurate within an acceptable tolerance and have not be severely affected by obstacles, noise, or other external factors.

Upon generating a high confidence level (i.e., the confidence level is above a prescribed tolerance), the orientation/angle estimates may be used for adjusting one or more parameters on the audio emission device, the audio capture device, and/or on another device. Conversely, upon generating a low confidence level (i.e., the confidence level is below the prescribed tolerance), the method may attempt to adjust one or more variables, including windowing parameters for the originally generated impulse responses, in an attempt to produce more accurate estimates.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments are described with reference to the appended drawings. While numerous details are set forth, it is understood that some embodiments of the invention may be practiced without these details. In other instances, well-known circuits, structures, and techniques have not been shown in detail so as not to obscure the understanding of this description.

Figure 1:
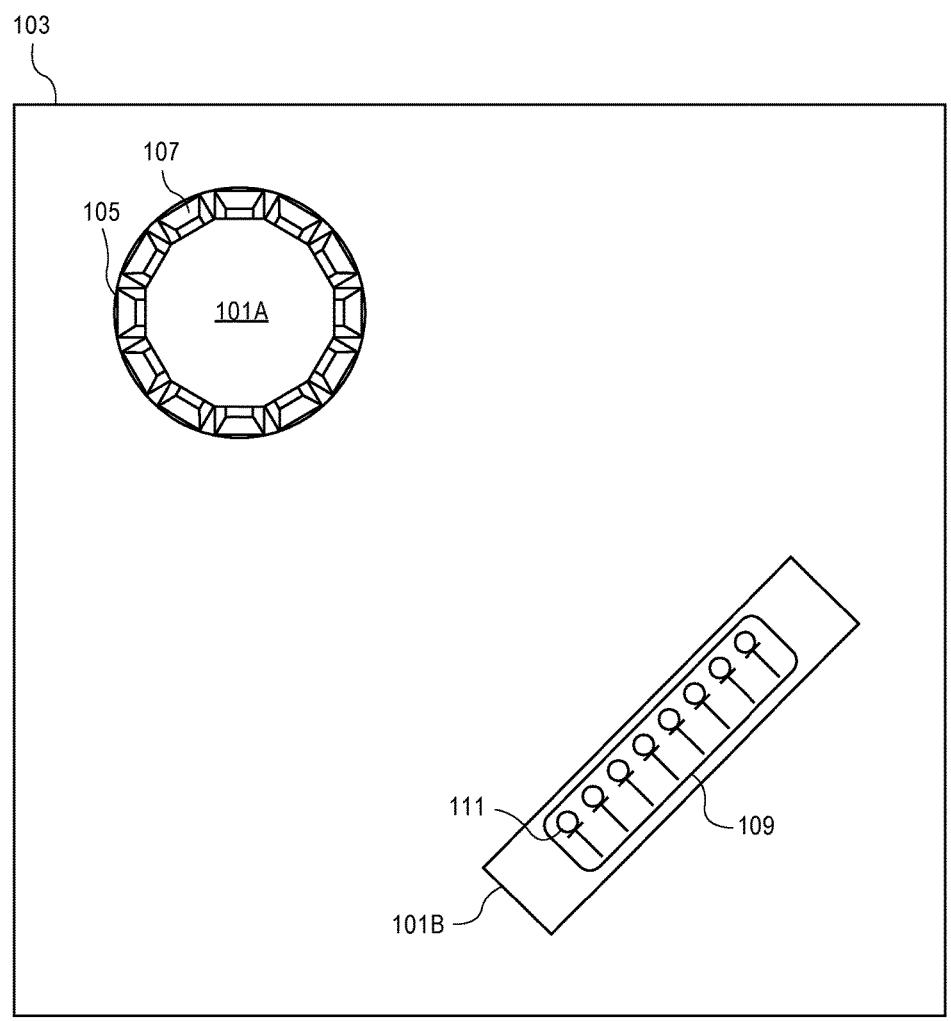
FIG. 1 shows an audio emission device and an audio capture device that may respectively emit and capture sound within a listening area according to one embodiment.

FIG. 1 shows an audio emission device 101A and an audio capture device 101B that may respectively emit and capture sound within a listening area 103. In particular, the audio emission device 101A may include a loudspeaker array 105, including a set of transducers 107, for emitting sound and the audio capture device 101B may include one or more microphones 109 (i.e., a standalone microphone 109 or a set of microphones 109 in a microphone array 111) for capturing sound. As will be described in greater detail below, the audio capture device 101B may produce a set of sound measurements based on detected sound originally emitted from the audio emission device 101A. In some embodiments, an expected set of values may be compared against a measured/processed set of values to determine a confidence level for these measurements. Upon achieving a high confidence level for a set of measurements (i.e., a confidence level above a threshold confidence level), a location/orientation of the devices 101A/101B relative to each may be determined using these verified measurements. The determined orientation may be used in conjunction with the confidence level for adjusting one or more settings on the audio devices 101A/101B and/or on another computing device.

As shown in FIG. 1, the audio devices 101A/101B may be located in a listening area 103. The listening area 103 may be a room of any size within a house, a commercial establishment, or any other structure. For example, the listening area 103 may be a home office of a user/listener.

Figure 2:
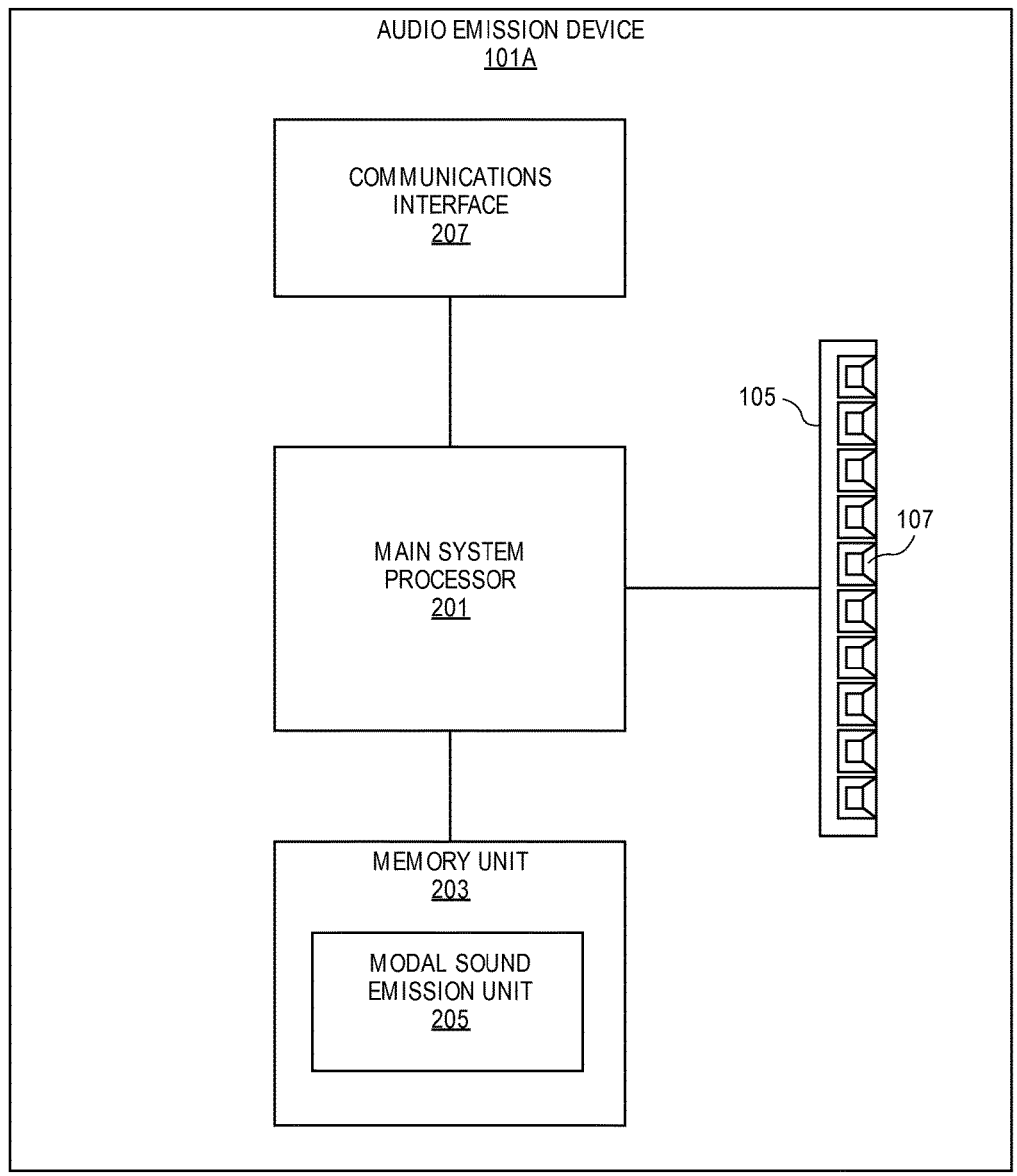
FIG. 2 shows a component diagram of the audio emission device according to one embodiment.

FIG. 2 shows a component diagram of the audio emission device 101A according to one embodiment. The audio emission device 101A may be any computing system that is capable of emitting sound into the listening area 103. For example, the audio emission device 101A may be a laptop computer, a desktop computer, a tablet computer, a video conferencing phone, a set-top box, a multimedia player, a gaming system, and/or a mobile device (e.g., cellular telephone or mobile media player). Each element of the audio emission device 101A shown in FIG. 2 will now be described.

The audio emission device 101A may include a main system processor 201 and a memory unit 203. The processor 201 and memory unit 203 are generically used here to refer to any suitable combination of programmable data processing components and data storage that conduct the operations needed to implement the various functions and operations of the audio emission device 101A. The processor 201 may be a special purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines) while the memory unit 203 may refer to microelectronic, non-volatile random access memory. An operating system may be stored in the memory unit 203, along with application programs specific to the various functions of the audio emission device 101A, which are to be run or executed by the processor 201 to perform the various functions of the audio emission device 101A. For example, the memory unit 203 may include a modal sound emission unit 205, which in conjunction with other hardware and software elements of the audio emission device 101A, emits a set of modal sound patterns into the listening area 103. As will be described in further detail below, these modal sound patterns may thereafter be detected and used by the audio capture device 101B for determining the orientation of the audio capture device 101B relative to the audio emission device 101A.

Figure 3:
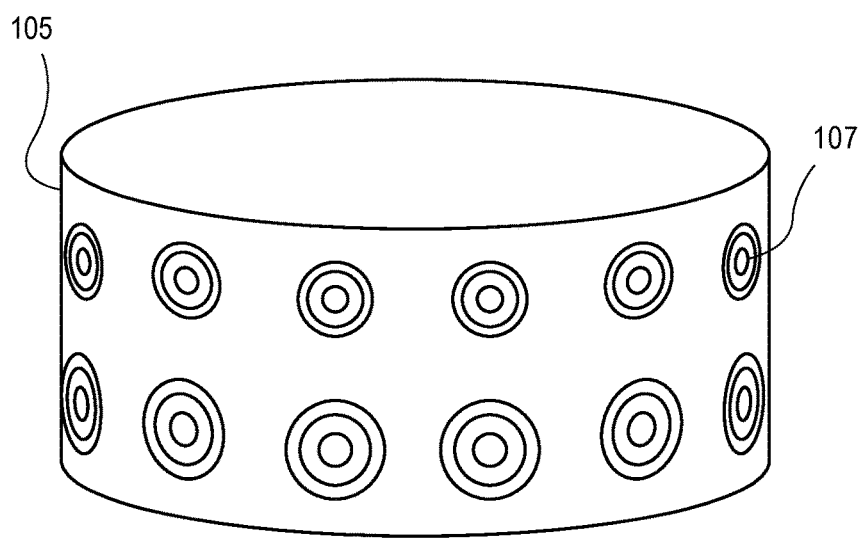
FIG. 3 shows a side view of the audio emission device according to one embodiment.

As noted above, in one embodiment, the audio emission device 101A may include a loudspeaker array 105 for outputting sound into the listening area 103. As shown in FIG. 1 and FIG. 2, the loudspeaker array 105 may include multiple transducers 107 housed in a single cabinet. In this example, the loudspeaker array 105 has ten distinct transducers 107 evenly aligned in a within a cabinet. Although shown in FIG. 2 as aligned is a flat plane or a straight line, the transducers 107 may be aligned in a curved fashion along an arc. For example, in one embodiment, the transducers 107 may be uniformly integrated on the face a cylindrical cabinet as shown in the overhead view of the audio emission device 101A in FIG. 1 and the side view of the audio emission device 101A shown in FIG. 3. In other embodiments, different numbers of transducers 107 may be used with uniform or non-uniform spacing and alignment.

The transducers 107 may be any combination of full-range drivers, mid-range drivers, subwoofers, woofers, and tweeters. Each of the transducers 107 may use a lightweight diaphragm, or cone, connected to a rigid basket, or frame, via a flexible suspension that constrains a coil of wire (e.g., a voice coil) to move axially through a cylindrical magnetic gap. When an electrical audio signal is applied to the voice coil, a magnetic field is created by the electric current in the voice coil, making it a variable electromagnet. The coil and the transducers' 107 magnetic system interact, generating a mechanical force that causes the coil (and thus, the attached cone) to move back and forth, thereby reproducing sound under the control of the applied electrical audio signal coming from a source.

Each transducer 107 may be individually and separately driven to produce sound in response to separate and discrete audio signals. By allowing the transducers 107 in the loudspeaker array 105 to be individually and separately driven according to different parameters and settings (including filters which control delays, amplitude variations, and phase variations across the audio frequency range), the loudspeaker array 105 may produce numerous directivity patterns to simulate or better represent respective channels of sound program content. For example, the transducers 107 in the loudspeaker array 105 may be individually driven to produce a set of modal patterns as will be described in greater detail below.

Although shown as including one loudspeaker array 105, the audio emission device 101A may include any number of loudspeaker arrays 105. Hereinafter, the audio emission device 101A will be described as including a single loudspeaker array 105; however, as described above, it is understood that the audio emission device 101A may operate in a similar fashion with multiple loudspeaker arrays 105.

In one embodiment, the audio emission device 101A may include a communications interface 207 for communicating with other components over one or more connections. For example, the communications interface 207 may be capable of communicating using Bluetooth, the IEEE 802.11x suite of standards, IEEE 802.3, cellular Global System for Mobile Communications (GSM), cellular Code Division Multiple Access (CDMA), and/or Long Term Evolution (LTE). In one embodiment, the communications interface 207 facilitates the transmission/reception of video, audio, and other pieces of data.

Figure 4:
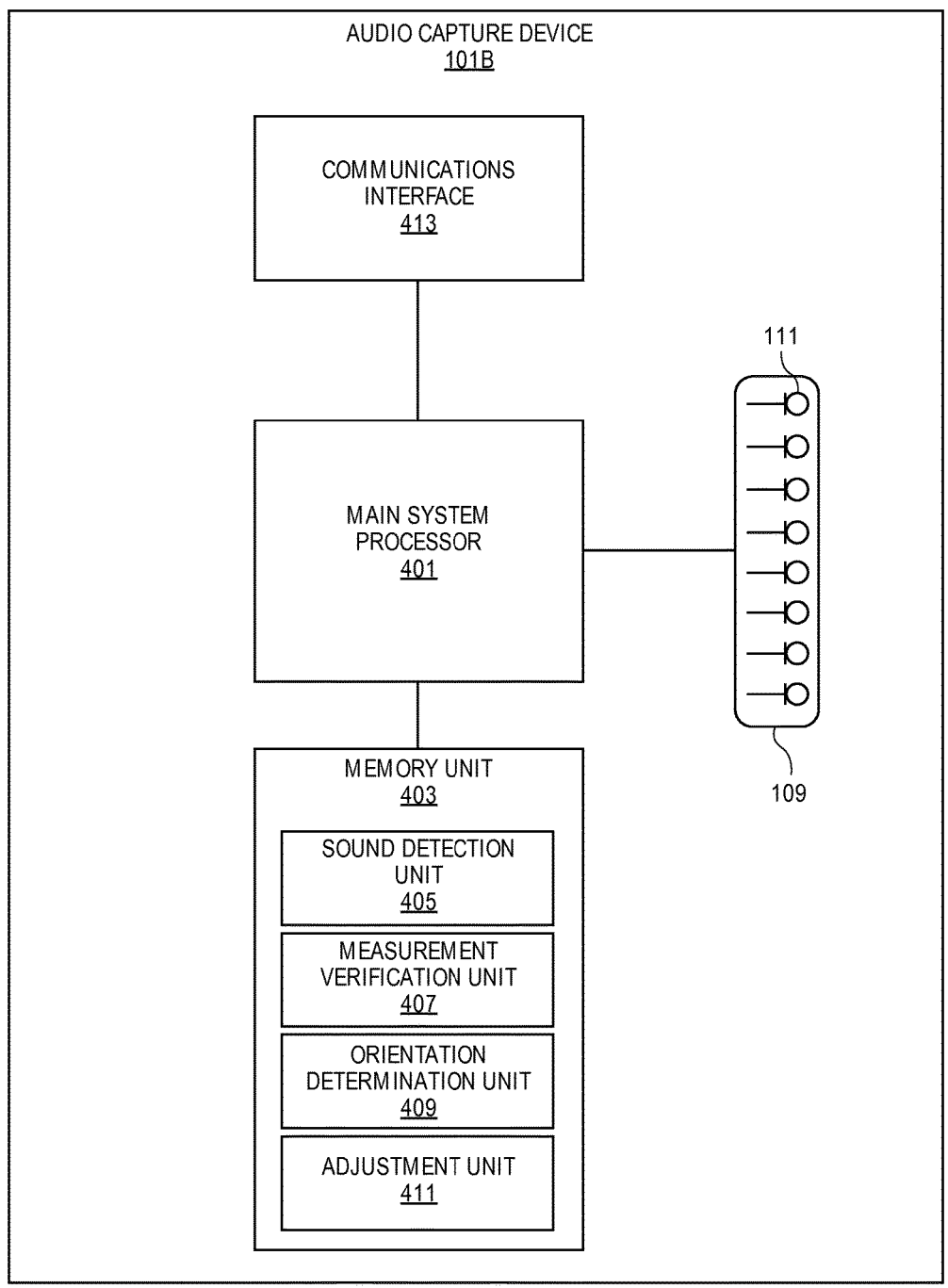
FIG. 4 shows a component diagram of the audio capture device according to one embodiment.

Turning now to FIG. 4, the audio capture device 101B will be described. The audio capture device 101B may be any computing system that is capable of detecting sound in the listening area 103. For example, the audio capture device 101B may be a laptop computer, a desktop computer, a tablet computer, a video conferencing phone, a set-top box, a multimedia player, a gaming system, and/or a mobile device (e.g., cellular telephone or mobile media player).

The audio capture device 101B may include a main system processor 401 and a memory unit 403. Similar to the processor 201 and memory unit 203, the processor 401 and the memory unit 403 are generically used here to refer to any suitable combination of programmable data processing components and data storage that conduct the operations needed to implement the various functions and operations of the audio capture device 101B. The processor 401 may be a special purpose processor such as an ASIC, a general purpose microprocessor, a FPGA, a digital signal controller, or a set of hardware logic structures (e.g., filters, arithmetic logic units, and dedicated state machines) while the memory unit 403 may refer to microelectronic, non-volatile random access memory. An operating system may be stored in the memory unit 403, along with application programs specific to the various functions of the audio capture device 101B, which are to be run or executed by the processor 401 to perform the various functions of the audio capture device 101B. For example, the memory unit 403 may include sound detection unit 405, a measurement verification unit 407, an orientation determination unit 409, and an adjustment unit 411. These units 405, 407, and 409, in conjunction with other hardware and software elements of the audio capture device 101B, (1) detect/measure sounds in the listening area 103 (e.g., modal beam patterns produced by the audio emission device 101A), (2) verify the accuracy of these measured sounds, and (3) determine the orientation of the audio capture device 101B in relation to the audio emission device 101A based on these verified measurements.

As noted above, in one embodiment, the audio capture device 101E may include one or more microphones 109. For example, the audio capture device 101B may include multiple microphones 109 arranged in a microphone array 111.

Each of the microphones 109 in the audio capture device 101B may sense sounds and convert these sensed sounds into electrical signals. The microphones 109 may be any type of acoustic-to-electric transducer or sensor, including a MicroElectrical-Mechanical System (MEMS) microphone, a piezoelectric microphone, an electret condenser microphone, or a dynamic microphone. The microphones 109 may utilize various filters that can control gain and phase across a range of frequencies (including possible use of delays) to provide a range of polar patterns, such as cardioid, omnidirectional, and figure-eight. The generated polar patterns alter the direction and area of sound captured in the vicinity of the audio capture device 101B. In one embodiment, the polar patterns of the microphones 109 may vary continuously over time.

In one embodiment, the audio capture device 101B may include a communications interface 413 for communicating with other components over one or more connections. For example, similar to the communications interface 207, the communications interface 413 may be capable of communicating using Bluetooth, the IEEE 802.11x suite of standards, IEEE 802.3, cellular GSM, cellular CDMA, and/or LTE. In one embodiment, the communications interface 413 facilitates the transmission/reception of video, audio, and other pieces of data.

Figure 5:
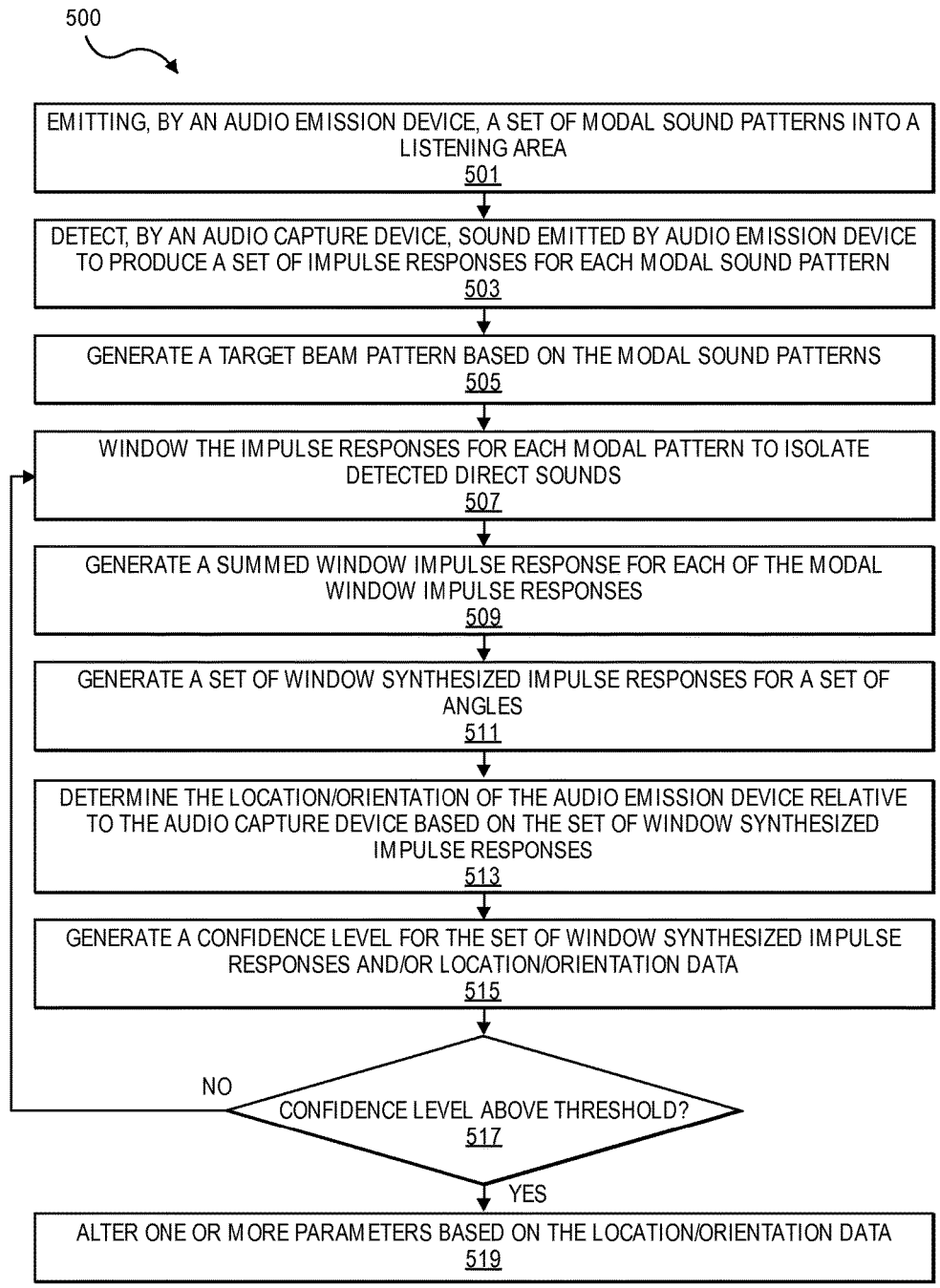
FIG. 5 shows a method for generating a robust confidence measure for acoustic beacon data according to one embodiment.

Turning now to FIG. 5, a method 500 for generating a robust confidence measure for acoustic beacon data will now be described. Each operation of the method 500 may be performed by one or more components of the audio emission device 101A, the audio capture device 101B, and/or another device. For example, one or more of the modal sound emission unit 205 of the audio emission device 101A and/or the sound detection unit 405, the measurement verification unit 407, and the orientation determination unit 409 of the audio capture device 101B may be used for performing the various operations of the method 500. Although the units 205, 405, 407, and 409 are described as residing in the memory units 203 and 403, respectively, in other embodiments, the units 205, 405, 407, and 409 may be implemented by one or more hardware structures, including hardware logic structures (e.g., filters, arithmetic logic units, and dedicated state machines).

Although the operations of the method 500 are shown and described in a particular order, in other embodiments the operations may be performed in a different order. For example, one or more of the operations may be performed concurrently or during overlapping time periods. Each operation of the method 500 will be described below by way of example.

Figure 6C:
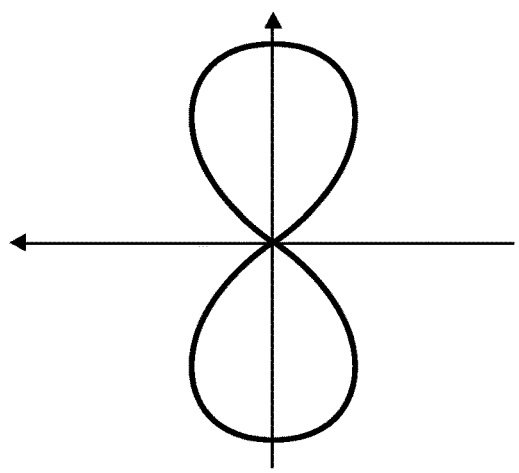
FIG. 6C shows a cardioid beam pattern pointed in a third direction based on a third set of weights applied to a set of modal patterns according to one embodiment.
Figure 6B:
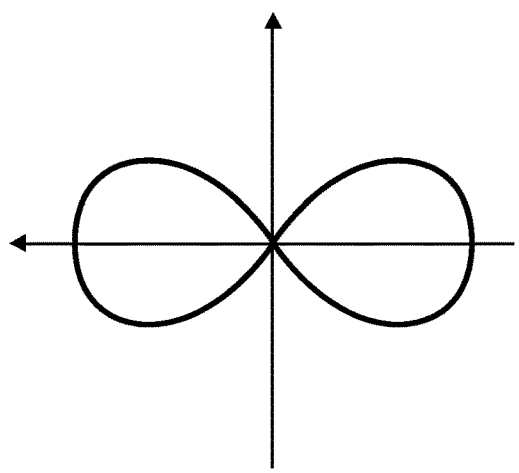
FIG. 6B shows a cardioid beam pattern pointed in a second direction based on a second set of weights applied to a set of modal patterns according to one embodiment.
Figure 6A:
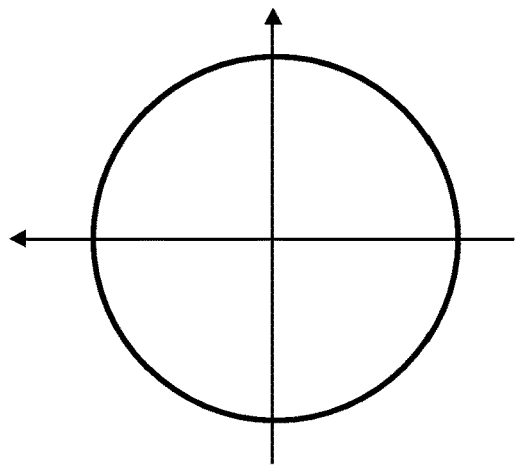
FIG. 6A shows a cardioid beam pattern pointed in a first direction based on a first set of weights applied to a set of modal patterns according to one embodiment.

In one embodiment, the method 500 may commence at operation 501 with the emission of a set of modal beam patterns by the audio emission device 101A. In particular, the transducers 107 in the loudspeaker array 105 of the audio emission device 101A may be separately driven to produce a set of predefined modal patterns. For instance, the predefined modal beam patterns may include an omnidirectional pattern (FIG. 6A), a vertical dipole pattern (FIG. 6B), and a horizontal dipole pattern (FIG. 6C). For the omnidirectional pattern, sound is equally radiated in all directions relative to the outputting loudspeaker array 105. For the vertical dipole pattern, sound is radiated in opposite directions along a vertical axis and symmetrical about a horizontal axis. For the horizontal dipole pattern, sound is radiated in opposite directions along the horizontal axis and symmetrical about the vertical axis. Although described as including omnidirectional, vertical dipole, and horizontal dipole patterns, in other embodiments the predefined sound/ beam modal patterns may include additional patterns, including higher order beam patterns. In one embodiment, each of the modal patterns may be orthogonal to each other and may be defined and driven at operation 501 by the modal sound emission unit 205.

In one embodiment, the modal beam patterns may be emitted at operation 501 by the loudspeaker array 105 of the audio emission device 101A during non-overlapping time periods. In other embodiments, the modal beam patterns may be emitted by the audio emission device 101A during at least partially overlapping time periods. In this embodiment, the modal beam patterns may be driven with orthogonal signals such that each modal pattern may be distinguished when later detected by the audio capture device 101B.

In some embodiments, operation 501 may be instigated by a user manually triggering the audio emission device 101A to reconfigure. In other embodiments, operation 501 may be instigated automatically by the audio emission device 101A and/or the audio capture device 101B. For example, the method 500 may be performed periodically at a defined interval (e.g., every hour, every day, every week, etc.) or based on a triggering event (e.g., booting the audio emission device 101A for the first time).

Figure 7A:
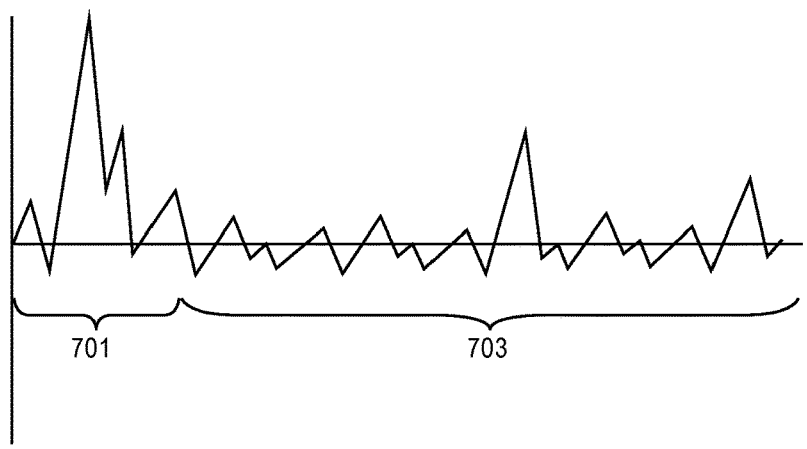
FIG. 7A shows an impulse response corresponding to an omnidirectional beam pattern according to one embodiment.
Figure 7B:
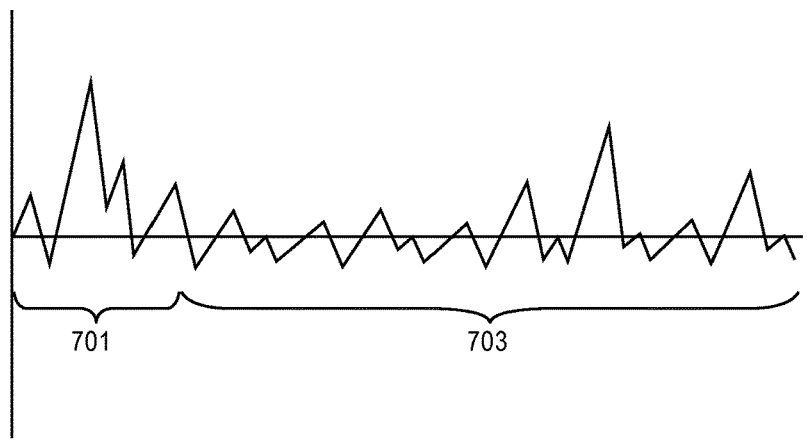
FIG. 7B shows an impulse response corresponding to a vertical dipole beam pattern according to one embodiment.
Figure 7C:
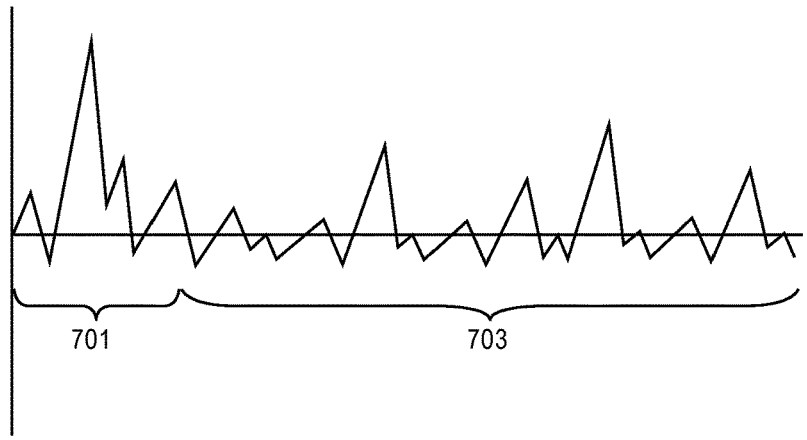
FIG. 7C shows an impulse response corresponding to a horizontal dipole beam pattern according to one embodiment.

Following production of the modal beam patterns at operation 501, the modal sound detection unit 405 may detect sound produced by each of the modal patterns to measure separate impulse responses h for each modal pattern at operation 503. For example, FIGS. 7A-7C respectively show the impulse responses h for an omnidirectional modal pattern, a vertical dipole modal pattern, and a horizontal dipole modal pattern as detected by the audio capture device 101E at operation 503. The individual impulse responses h for each modal pattern may be generated based on sounds detected by the microphones 111 in the audio capture device 101B.

Although the impulse responses h ideally represent the direct sound path between the audio emission device 101A and the audio capture device 101B, in many cases these impulse responses h may be affected by characteristics of the listening area 103, objects within the listening area 103, noises external to the modal patterns generated at operation 501, or other similar disturbances. Accordingly, any orientation determination regarding the positioning of the audio emission device 101A relative to the audio capture device 101B based on these impulse responses h, may be skewed by these external factors. Even though these factors may negatively affect orientation estimates, some level of distortion/disturbance may be acceptable and within normal tolerances while other levels of distortion may significantly alter any location/orientation estimates and render such estimates useless. Accordingly, as will be described in greater detail below, the method 500 may attempt to determine an accuracy or confidence level regarding these measurements produced at operation 503 and/or any location/orientation determinations generated based on these impulse response h measurements. These confidence levels may thereafter be utilized when (1) adjusting one or more parameters of the audio emission device 101A and/or the audio capture device 101B and/or (2) adjusting parameters of the method 500 to improve the confidence level of measured data.

Figure 8A:
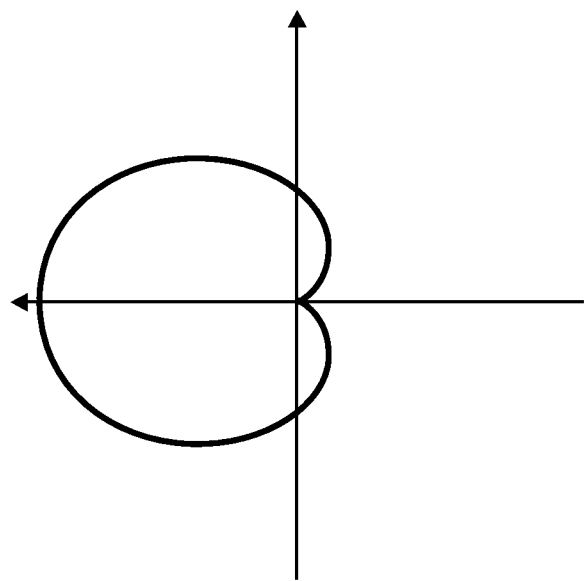
FIG. 8A shows a first sample cardioid beam pattern that may be defined as a target beam according to one embodiment.

Following the determination of modal specific impulse responses h, the measurement verification unit 407 may determine at operation 505 a target beam, which will be used determining the accuracy of measurements generated at operation 503 as will be described in greater detail below. The target beam may be any style or shape sound beam pattern that provides the ability to demonstrate direction relative to the audio emission device 101A. For example, FIG. 8A shows a sample cardioid beam pattern that may be defined as the target beam at operation 505. The target beam may be defined in terms of the modal patterns using a set of weights w. For example, the three modal beam patterns shown in FIGS. 6A-6C (i.e., an omnidirectional pattern, a vertical dipole pattern, and a horizontal dipole pattern), may be represented as $\cos(0\cdot\theta)$, $\cos(\theta)$, and $\sin(\theta)$, respectively. Accordingly, weights w may be applied to each of these modal pattern definitions and these weighted values may be linearly combined to arrive at the target beam pattern (TBP) as shown below:

$$TBP = w_1 \cos(0\cdot\theta) + w_2 \cos(\theta) + w_2 \sin(\theta) \quad \text{Equation 1}$$

In the above equation, the weights w may be any real number values. Further, the same weight $w_2$ is applied to both vertical and horizontal dipole patterns to ensure that the target beam pattern maintains a uniform shape as the weighted values w are altered. In other embodiments where additional and/or higher order modal patterns are used, the set of weights w may be similarly applied for pairs of modal patterns as shown below:

$$TBP = w_1 \cos(0\cdot\theta) + w_2 \cos(\theta) + w_2 \sin(\theta) + w_3 \cos(2\theta) + w_3 \sin(2\theta) \quad \text{Equation 2}$$

Figure 8B:
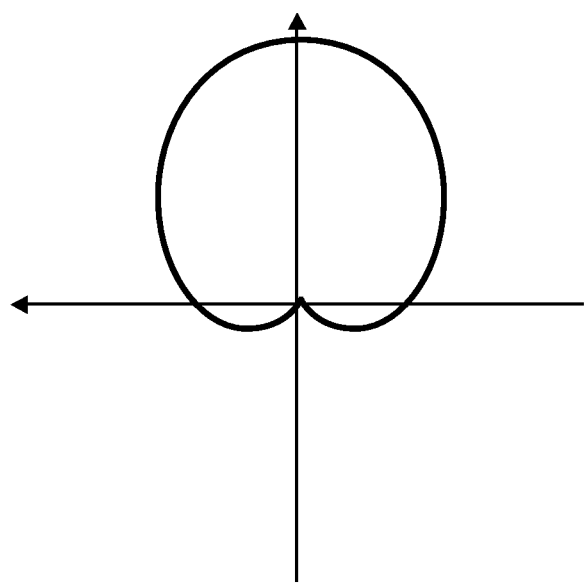
FIG. 8B shows a sample cardioid beam pattern that may be defined as a target beam according to one embodiment.

By changing the weights w applied to each modal pattern, different target beams may be generated. For example, weights $w_1$ and $w_2$ may be generated at operation 505 and utilized in Equation 1 to arrive at the upward pointed cardioid pattern shown in FIG. 8A while a separate set of weighting values w may be used with Equation 1 to generate a cardioid pattern aimed horizontally and to the right as shown in FIG. 8B. Accordingly, the direction of a pattern may be altered to sweep around the listening area 103 by changing weight values w provided in the equations above.

Figure 9A:
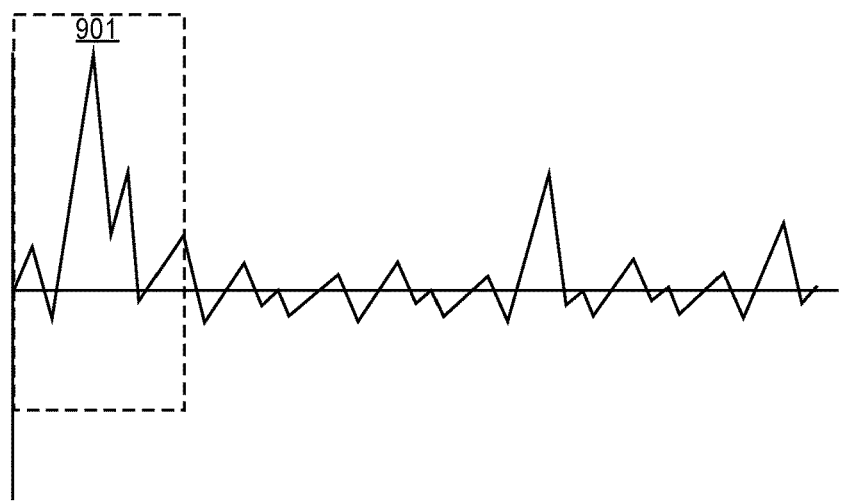
FIG. 9A shows a windowed impulse response corresponding to an omnidirectional beam pattern according to one embodiment.
Figure 9B:
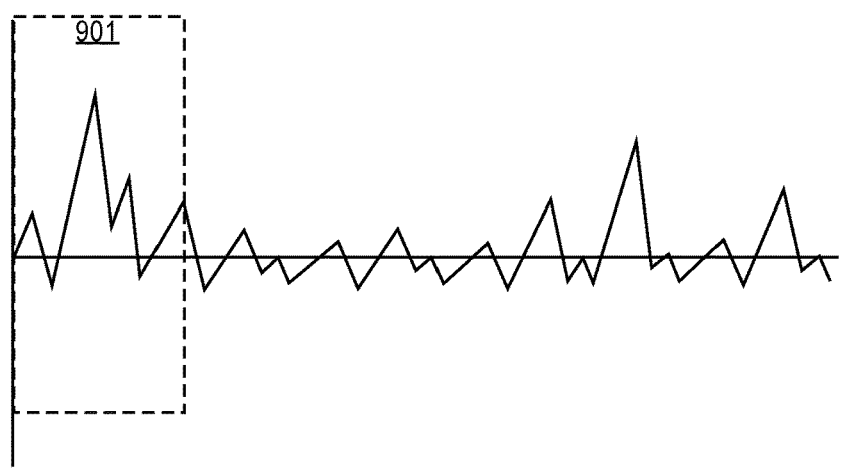
FIG. 9B shows a windowed impulse response corresponding to a vertical dipole beam pattern according to one embodiment.
Figure 9C:
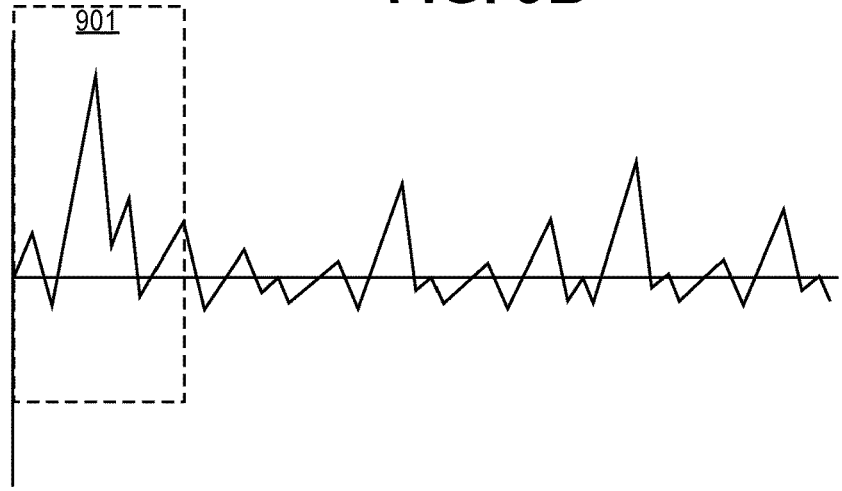
FIG. 9C shows a windowed impulse response corresponding to a horizontal dipole beam pattern according to one embodiment.

At operation 507, the impulse responses h generated at operation 503 may be analyzed by the orientation determination unit 409 to remove reflections or other distortions that do not represent the direct sound energy for each modal pattern emitted at operation 501. For example, the impulse response h shown in FIG. 7A corresponding to an omnidirectional beam pattern, may include a direct component 701 and a set of reflections 703. These reflections may negatively affect a synthesized beam shape, which will be later generated based on the impulse responses h for each modal pattern. Accordingly, to remove this potential negative effect from reflections or other not direct sound path sources, operation 507 may carve out a window around a peak in each of the impulse responses h. For example, operation 507 may create a window 901 around the direct component peak as shown in FIG. 9A for the omnidirectional beam pattern. Similar windows 901 may be generated for each other modal beam pattern as shown in FIGS. 9B and 9C. Each of these windows 901 may frame the global or local peak in the total impulse response h and a variable amount of adjacent values (e.g., +/−2.0 milliseconds). Accordingly, operation 507 may generate a windowed impulse response h for each modal impulse response h.

Although in many cases a global peak in the impulse response h for each modal pattern may represent direct sounds for each modal pattern, in some cases a peak in the impulse response h may represent reflections and/or noise. For example, a set of combined reflections may produce a larger peak in the impulse response h in comparison to earlier arriving direct sounds for a particular modal pattern. To account for peaks that do not represent direct sounds, operation 507 may utilize a peak threshold value when generating windowed impulse responses ĥ. For example, the peak threshold value may be set to 70% of the global peak value for a particular impulse response h. Any local peaks in the impulse response h for a modal pattern that are earlier in time than the global peak and are greater than this threshold value (e.g., greater than 70% of the global impulse response h peak) may be considered representative of direct sounds from a corresponding modal pattern. Accordingly, a window 901 may be provided around this local peak to create the windowed impulse response ĥ in a similar fashion as described above as this local peak represents direct sounds from a corresponding modal pattern. The peak threshold value for determining direct sounds may be dynamically adjusted as will be described in further detail below.

At operation 509 a summed windowed impulse response $\hat{h}_s$ may be calculated by the orientation determination unit 409 for each modal pattern windowed impulse response $\hat{h}_s$ generated at operation 507. In particular, the summed windowed impulse response $\hat{h}_s$ may be the sum of all amplitude values within a window impulse response ĥ for a given modal pattern. The summed window impulse response $\hat{h}_s$ may be used at operation 511 by the orientation determination unit 409 to generate a window synthesized set of impulse responses A. The window synthesized impulse responses A may be calculated as the weighted sum for a plurality of corresponding angle values θ. For example, the window synthesized impulse responses A may be calculated as shown below:

$$A(\theta)=w_1\hat{h}_{s1}\cos(0\cdot\theta)+w_2\hat{h}_{s2}\cos(\theta)+w_2\hat{h}_{s3}\sin(\theta) \quad \text{Equation 3}$$

In one embodiment, a set of window synthesized impulse responses A may be calculated for a set of angles θ at operation 511. For example, a set of window synthesized impulse responses A may be calculated for θ angle values 0°, 45°, 90°, 135°, 180°, 225°, 270°, and 315°. The window synthesized impulse responses A and corresponding angles θ may be used for representing a measured version of the target beam. In particular, the window synthesized impulse responses A may represent amplitude values at corresponding angles θ based on the measured impulse response h for each modal pattern obtained at operation 503 and summed windowed impulse response $\hat{h}_s$ values for each modal pattern calculated at operation 509.

At operation 513, the location/orientation of the audio emission device 101A relative to the audio capture device 101B may be determined by the orientation determination unit 409. In one embodiment, this location/orientation may be based on the window synthesized impulse response values A and corresponding angle values θ. In particular, operation 513 may determine a location/orientation value by determining the largest window synthesized impulse response A and a corresponding angle value θ. The angle value θ corresponding to the largest window synthesized impulse response value A indicates the likely direction of the audio capture device 101B relative to the audio emission device 101A. Specifically, the largest window synthesized impulse response value A indicates the highest level of direct sounds from the modal patterns produced by the audio emission device 101A at operation 501. Accordingly, the angle value θ corresponding to the largest window synthesized impulse response value A may correspond to the direction of the audio capture device 101E relative to the audio emission device 101A.

In some embodiments, the largest window synthesized impulse response value A may also be used at operation 513 to determine the distance between the audio emission device 101A and the audio capture device 101B. In particular, operation 513 may estimate a distance between the devices 101A and 101B based on the original strength of signals emitted at operation 501 and the strength of signals detected along a direct route, which correspond to the largest window synthesized impulse response value A. The level of attenuation between these emitted and detected signals may be used to determine the distance between the audio emission device 101A and the audio capture device 101B at operation 513.

After determining a location/orientation/direction at operation 513 (i.e., the angle value θ corresponding to the largest window synthesized impulse response value A), the measurement verification unit 407 at operation 515 may verify that the location/orientation/direction results determined at operation 513 are accurate (i.e., within a level of accuracy). In one embodiment, this accuracy may be determined by comparing the window synthesized impulse responses A obtained at operation 511 with values corresponding to the target beam generated at operation 505.

Figure 10A:
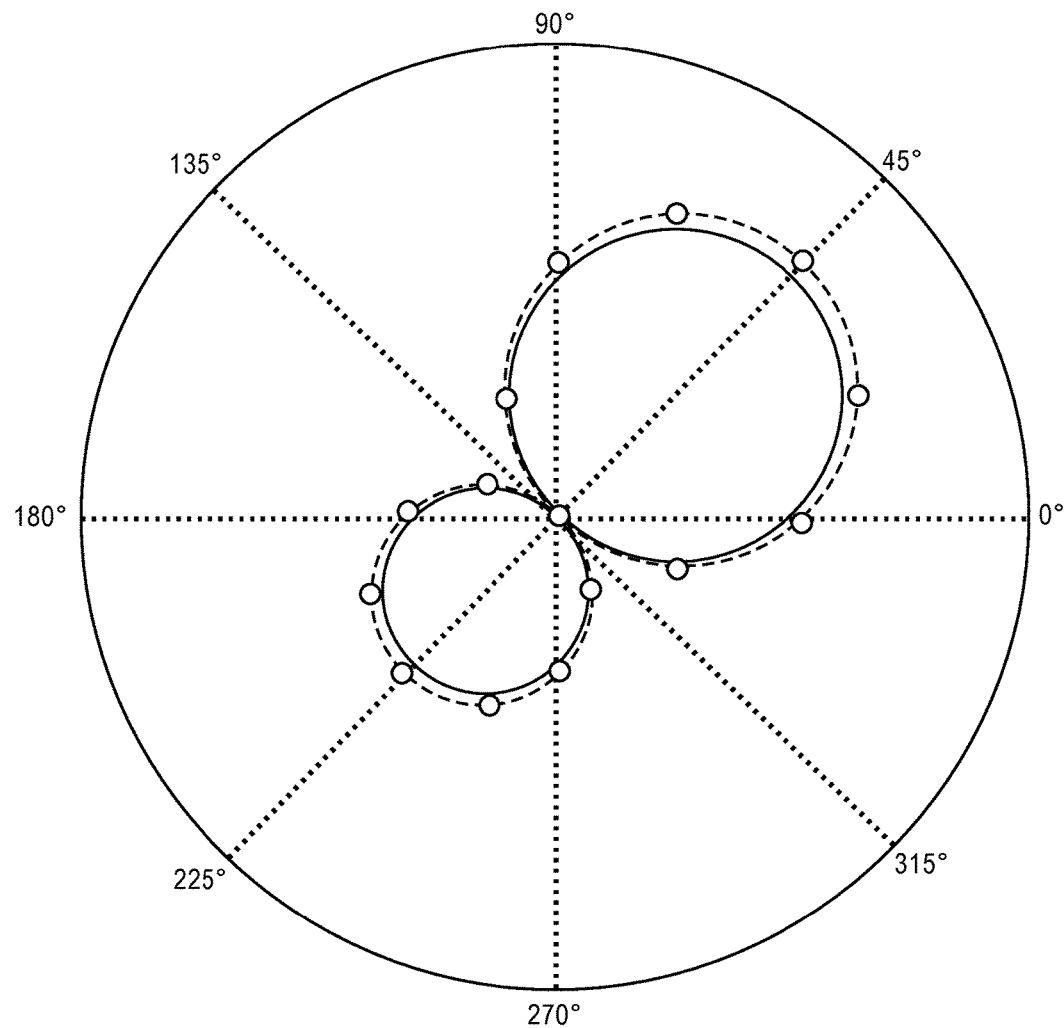
FIG. 10A shows a first example polar plot for a target beam and a first set of window synthesized impulse responses according to one embodiment.

FIG. 10A shows a first example polar plot for the target beam obtained at operation 505 and a first set of window synthesized impulse responses A obtained at operation 511. In particular, the target beam is shown as a solid line while the set of window synthesized impulse responses A are shown as points connected with a dashed line. In this first example, the set of window synthesized impulse responses A closely follow the target beam as can be seen by the similarity in shapes offered by both the dashed and solid lines. Although in this example, there are some disparities between the two shapes, as noted above, the shapes are generally the same.

Figure 10B:
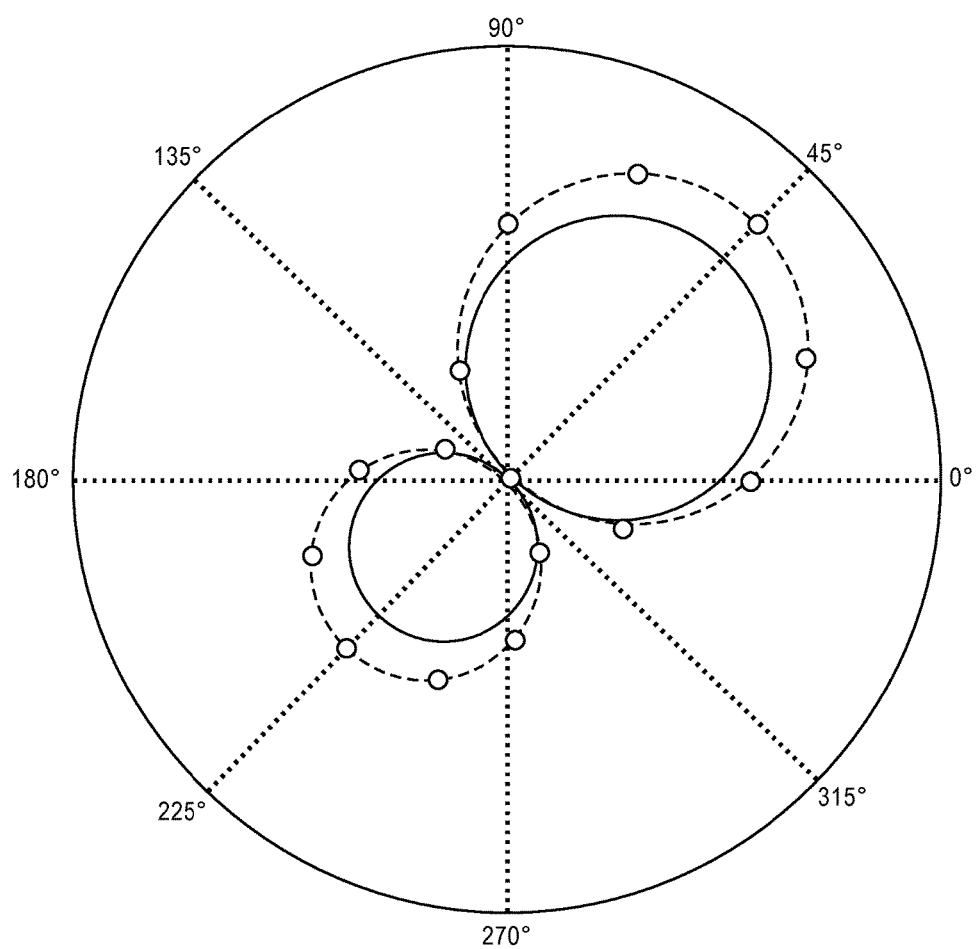
FIG. 10B shows a second example polar plot for a target beam and a second set of window synthesized impulse responses according to one embodiment.

FIG. 10B shows a second example polar plot for the target beam obtained at operation 505 and a second set of window synthesized impulse responses A obtained at operation 511. In contrast to FIG. 10A, the shapes shown in FIG. 10B are relatively dissimilar. This dissimilarity may be the result of interfering objects within the listening area 103, external noises present while the modal patterns are emitted at operation 501, and/or obtaining the wrong values from the measured impulse responses at operation 507 (i.e., windowing non-direct sounds in the modal impulse responses h).

In one embodiment, operation 515 may determine a confidence or accuracy level for the window synthesized impulse responses A. This confidence level may be based on the difference between the window synthesized impulse responses A and their corresponding target beam counterpart values at each angle θ. For example, given a set of window synthesized impulse responses A and values corresponding to the contours of the target beam (e.g., defined by Equation 1 or Equation 2 above), a difference level or percentage of dissimilarity between the target beam and the window synthesized impulse responses A may be determined. This difference level or percentage of dissimilarity generated at operation 515 may be used as a confidence level for determining the accuracy of measurements. In particular, when a low confidence level has been achieved (i.e., the confidence level is below a prescribed confidence level threshold), this low confidence may be detected by the measurement verification unit 407 at operation 517 and prompt the method 500 to change the window size and/or window placement at operation 507.

Figure 11:
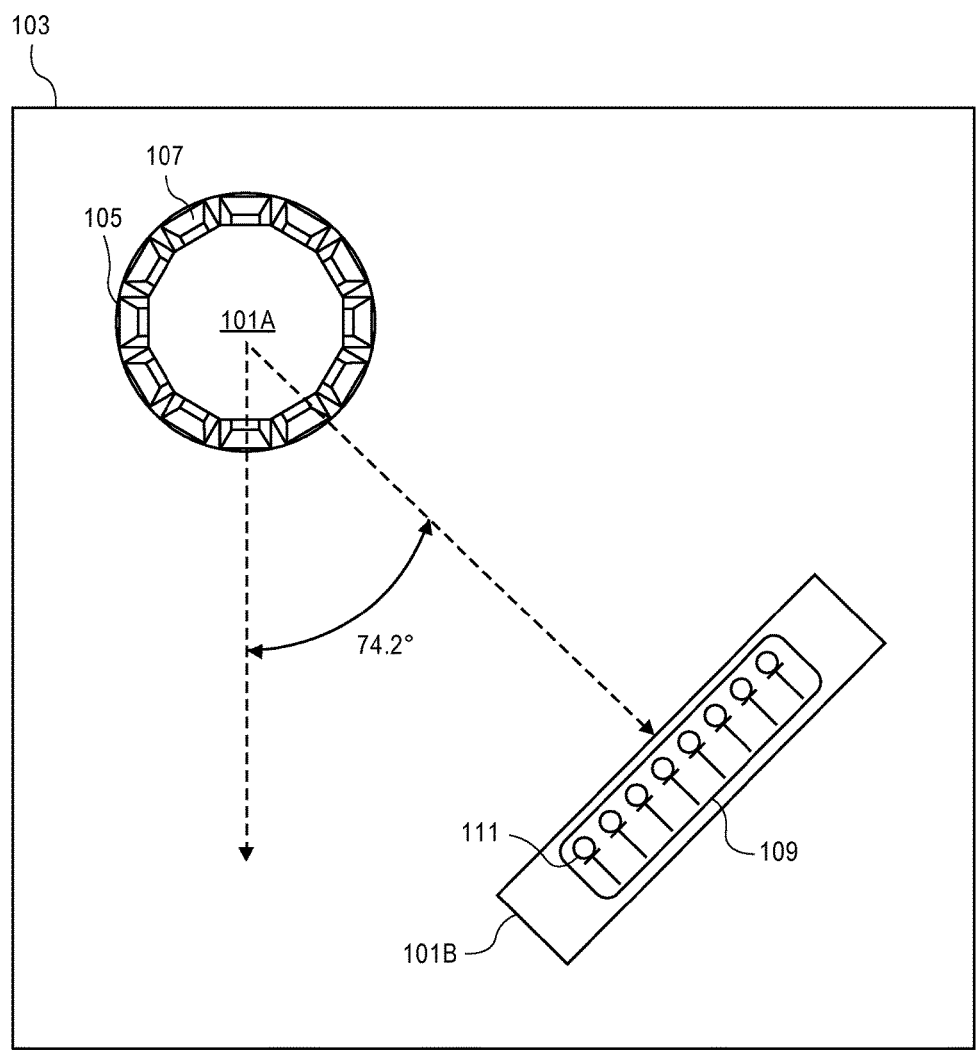
FIG. 11 shows a determined angle between the audio emission device and the audio capture device according to one embodiment.

In contrast, upon determining a high confidence level at operation 517 (i.e., the confidence level is above the prescribed confidence level threshold), the method 500 may move to operation 519 to alter one or more parameters/settings of the audio emission device 101A, the audio capture device 101B, and/or another device based on the determined location/orientation/direction and/or distance between the devices 101A/101B. For example, upon determining an angle between the devices 101A/101B relative to an axis as shown in FIG. 11, operation 519 may adjust settings in the audio emission device 101A such that sound beams for a piece of sound program content generated by the audio emission device 101A (e.g., a musical composition or an audio track of a film) are directed at the audio capture device 101B. In this example, the audio capture device 101E may be proximate a listener and the location/orientation/direction and/or distance determined at operation 513 may correspond to the location/orientation/direction and/or distance of the listener relative to the audio emission device 101A.

As described above, the method 500 generates a confidence level for associated beacon data (e.g., location/orientation information and/or a window synthesized set of impulse responses A). This confidence level may be used for determining the accuracy of beacon data and when such data should be recalculated. Namely, the method 500 may ensure that obstacles, noise, or other external factors in the listening area 103 are not severely impacting location/orientation estimates.

As explained above, an embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. A method for determining accuracy of audio beacon data, comprising:
    detecting, by an audio capture device, a set of sounds produced by an audio emission device;
    generating a target beam pattern based on a set of modal patterns, wherein the modal patterns correspond to the set of sounds;
    generating a set of window synthesized impulse responses based on the detected sounds and the set of modal patterns;
    determining an angle corresponding to the largest window synthesized impulse response in the set of window synthesized impulse responses, wherein the angle represents the location of the audio capture device relative to the audio emission device; and
    determining a confidence level for the set of window synthesized impulse responses and the angle representing the location of the audio capture device relative to the audio emission device based on a comparison between points along the target beam pattern and the set of window synthesized impulse responses.

2. The method of claim 1, further comprising:
    determining a set of impulse responses based on the detected set of sounds, wherein each impulse response corresponds to a separate modal pattern in the set of modal patterns.

3. The method of claim 2, further comprising:
    selecting a portion of an impulse response for each modal pattern corresponding to direct sounds to generate a windowed impulse response for each modal pattern.

4. The method of claim 3, wherein the target beam pattern is generated based on weights applied to each modal pattern and the weighted modal patterns are linearly summed.

5. The method of claim 4, wherein the weights applied to each modal pattern to generate the target beam pattern are applied to the windowed impulse responses to generate window synthesized impulse responses at a set of sample angles.

6. The method of claim 5, wherein the difference between points on the target beam pattern and the window synthesized impulse responses at corresponding angles determines the confidence level.

7. The method of claim 3, wherein the portion of an impulse response for a modal pattern corresponding to direct sounds to generate a windowed impulse response for each modal pattern is chosen by:
    selecting the earliest occurring local peak in a corresponding impulse response that is within a predefined peak threshold of a global peak of the impulse response.

8. The method of claim 7, further comprising:
    adjusting the predefined peak threshold upon determining that the confidence level is below a prescribed confidence level.

9. An audio capture device, comprising:
    a set of microphones to detect sounds emitted by an audio emission device, wherein each of the sounds corresponds to a modal pattern in a set of modal patterns;
    an orientation determination unit to (1) generate a set of window synthesized impulse responses based on the detected sounds and the set of modal patterns and (2) determine an angle corresponding to the largest window synthesized impulse response in the set of window synthesized impulse responses, wherein the angle represents the location of the audio capture device relative to the audio emission device; and
    a verification unit to (1) define a target beam pattern based on the set of modal patterns and (2) determine a confidence level for the set of window synthesized impulse responses based on a comparison between points along the target beam pattern and the set of window synthesized impulse responses.

10. The audio capture device of claim 9, wherein the orientation determination unit is to further select a portion of an impulse response for each modal pattern corresponding to direct sounds to generate a windowed impulse response for each modal pattern,
    wherein the target beam pattern is generated based on weights applied to each modal pattern and the weighted modal patterns are linearly summed,
    wherein the weights applied to each modal pattern to generate the target beam pattern are applied to the windowed impulse responses to generate window synthesized impulse responses at a set of sample angles.

11. The audio capture device of claim 10, wherein the difference between points on the target beam pattern and the window synthesized impulse responses at corresponding angles is used by the verification unit to determine the confidence level.

12. The audio capture device of claim 10, wherein the portion of an impulse response for a modal pattern corresponding to direct sounds to generate a windowed impulse response for each modal pattern is the earliest occurring local peak in a corresponding impulse response that is within a predefined peak threshold of a global peak of the impulse response.

13. The audio capture device of claim 12, wherein the predefined peak threshold is adjusted by the orientation determination unit upon determining by the verification unit that the confidence level is below a prescribed confidence level.

14. An article of manufacture, comprising:
a non-transitory machine-readable storage medium that stores instructions which, when executed by a processor in an audio capture computing device,
generate a target beam pattern based on a set of modal patterns, wherein the modal patterns correspond to a set of detected sounds emitted by an audio emission device;
generate a set of window synthesized impulse responses based on the detected sounds and the set of modal patterns;
determine an angle corresponding to the largest window synthesized impulse response in the set of window synthesized impulse responses, wherein the angle represents the location of the audio capture device relative to the audio emission device; and
determine a confidence level for the set of window synthesized impulse responses and the angle representing the location of the audio capture device relative to the audio emission device based on a comparison between points along the target beam pattern and the set of window synthesized impulse responses.

15. The article of manufacture of claim 14, wherein the non-transitory machine-readable storage medium includes further instructions that when executed by the processor:
determine a set of impulse responses based on the detected set of sounds, wherein each impulse response corresponds to a separate modal pattern in the set of modal patterns.

16. The article of manufacture of claim 15, wherein the non-transitory machine-readable storage medium includes further instructions that when executed by the processor:
select a portion of an impulse response for each modal pattern corresponding to direct sounds to generate a windowed impulse response for each modal pattern.

17. The article of manufacture of claim 16, wherein the target beam pattern is generated based on weights applied to each modal pattern and the weighted modal patterns are linearly summed.

18. The article of manufacture of claim 17, wherein the weights applied to each modal pattern to generate the target beam pattern are applied to the windowed impulse responses to generate window synthesized impulse responses at a set of sample angles.

19. The article of manufacture of claim 18, wherein the difference between points on the target beam pattern and the window synthesized impulse responses at corresponding angles determines the confidence level.

20. The article of manufacture of claim 16, wherein the portion of an impulse response for a modal pattern corresponding to direct sounds to generate a windowed impulse response for each modal pattern is chosen by:
selecting the earliest occurring local peak in a corresponding impulse response that is within a predefined peak threshold of a global peak of the impulse response.

* * * * *